Oct. 21, 1969  O. C. STOUT ET AL  3,474,033

PROCESS AND PLANT FOR SEWAGE TREATMENT

Filed April 27, 1967   2 Sheets-Sheet 1

INVENTORS:
Orin C. Stout &
Dale E. Wiltrout by Sparrow and Sparrow

ATTORNEYS.

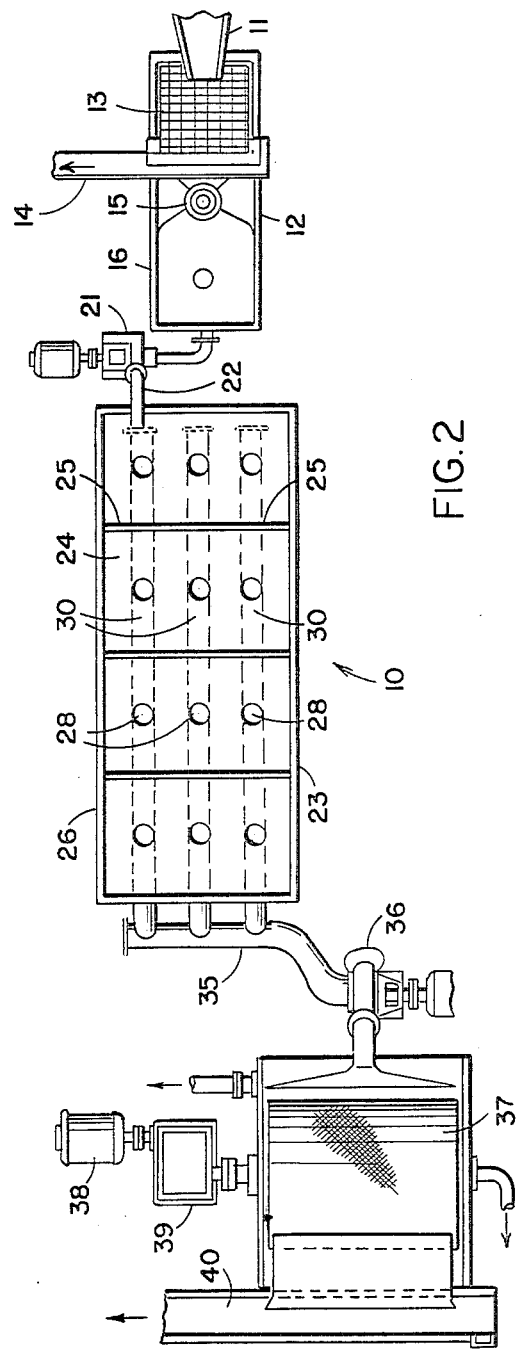

3,474,033
PROCESS AND PLANT FOR SEWAGE TREATMENT
Orin C. Stout, Phoenix, Ariz., and Dale E. Wiltrout, Wyckoff, N.J., assignors to Ultra Dynamics Corporation, Paterson, N.J.
Filed Apr. 27, 1967, Ser. No. 634,236
Int. Cl. C02b 1/34
U.S. Cl. 210—50           9 Claims

ABSTRACT OF THE DISCLOSURE

Process and plant for the treatment of sewage and waste materials containing organic matter in colloidal form. The sewage is comminuted to convert it into a substantially uniformly distributed form. Marl, lime, alum and activated carbon are added to the sewage mix for the purpose of coagulating the organic colloidal matter in the sewage mix. The coagulated matter is then adsorbed by the four agents, and the coagulated and adsorbed matters are settled in settling tanks. After settling the resulting effluent is filtered.

Background of the invention

Treatment of sewage and the like liquid wastes is conventionally perofrmed in two ways: either by biological processes or by treatment of the raw sewage with chemical means. The prior art reveals means pertaining to the latter treatment; however, none of the known processes using various kinds of additives has been found by which a perfect result could be attained, except for discharging the treated effluent into lakes, rivers or streams without causing damage to the aquatic life therein. Since the provision of pure water, particularly bacteria-free and hygienically purified water is very important for the health of people and animals, it is necessary to treat the waste waters and sewage of communities and industrial plants to prevent the natural water resources from becoming polluted. The component parts in the sewage or in the like liquid, waste may be grouped into three forms, that is, into parts in suspension, in solution and in colloidal form. The latter are the most difficult to remove and can only be successfully treated by the ion process and by coagulating. It also is known that many component parts tend to ferment and to putrify very rapidly, particularly under conditions of elevated temperatures, thereby releasing offensive odors such as indole, scatole, hydrogen sulfide and mercaptan. Therefore it is a problem to control instantaneously all these offensive and obnoxious odors and to conduct the further treatment of the wastes without them. The complex problems as outlined above are solved by this invention.

Summary of the invention

This invention deals with the treatment of sewage and the like waste material in order to prevent water pollution and particularly to a new and improved process for treating such waste by which hygienically unobjectionable potable water can be attained, and to a new plant and combination of apparatus for executing the process.

More particularly, the invention concerns itself with process of treating sewage or like waste material containing organic matter in colloidal form by screening the sewage and comminuting the sewage for converting it into a substantially uniformly distributed form, adding to the comminuted sewage a mix comprising both natural mineral and chemical means, for example: marl, lime, ionizable and other agents, coagulating the organic colloidal matter in the sewage, absorbing the coagulated matters by the mineral means, settling the coagulated and absorbed matters and filtering the resulting clear effluent after the settling.

The invention further concerns itself with a plant for processing the raw sewage or the like in which means are provided for comminuting the sewage and means for adding a compound mix of treatment additives to the comminuted sewage and further providing settling compartments for separating the solids from the liquids of the sewage, and means for further treating such solids.

The invention consists in such novel features, construction arrangements, combination of parts and improvements as may be shown and described in connection with the apparatus herein disclosed by way of example only and as illustrative of a preferred embodiment. Objects and advantages of the invention will be set forth and in part will be obvious herefrom or may be learned by practicing tne invention, the same being realized and attained by means of the instrumentalities and combinations pointed out in the appended claims.

It is an object of the present invention to provide a new process for treating sewage and other waste liquids with inorganic minerals.

Another object of the invention is to provide a sewage treatment process without the use of chlorine salts.

Furthermore, it is an object of the invention to provide a process for the treatment of sewage without the release of bad, obnoxious and offensive odors. A further object of the invention is to provide a process for treating raw sewage for obtaining a clear, hygienically unobjectionable water.

Brief description of the drawing

In the following description and in the claims, parts will be identified by specific names for convenience, but such names are intended to be as generic in their application to similar parts as the art will permit. Like reference characters denote like parts in the figures of the drawing, in which:

FIG. 2 is a plan view of the plant shown in FIG. 1.

Description of the preferred embodiment

Figure 1:
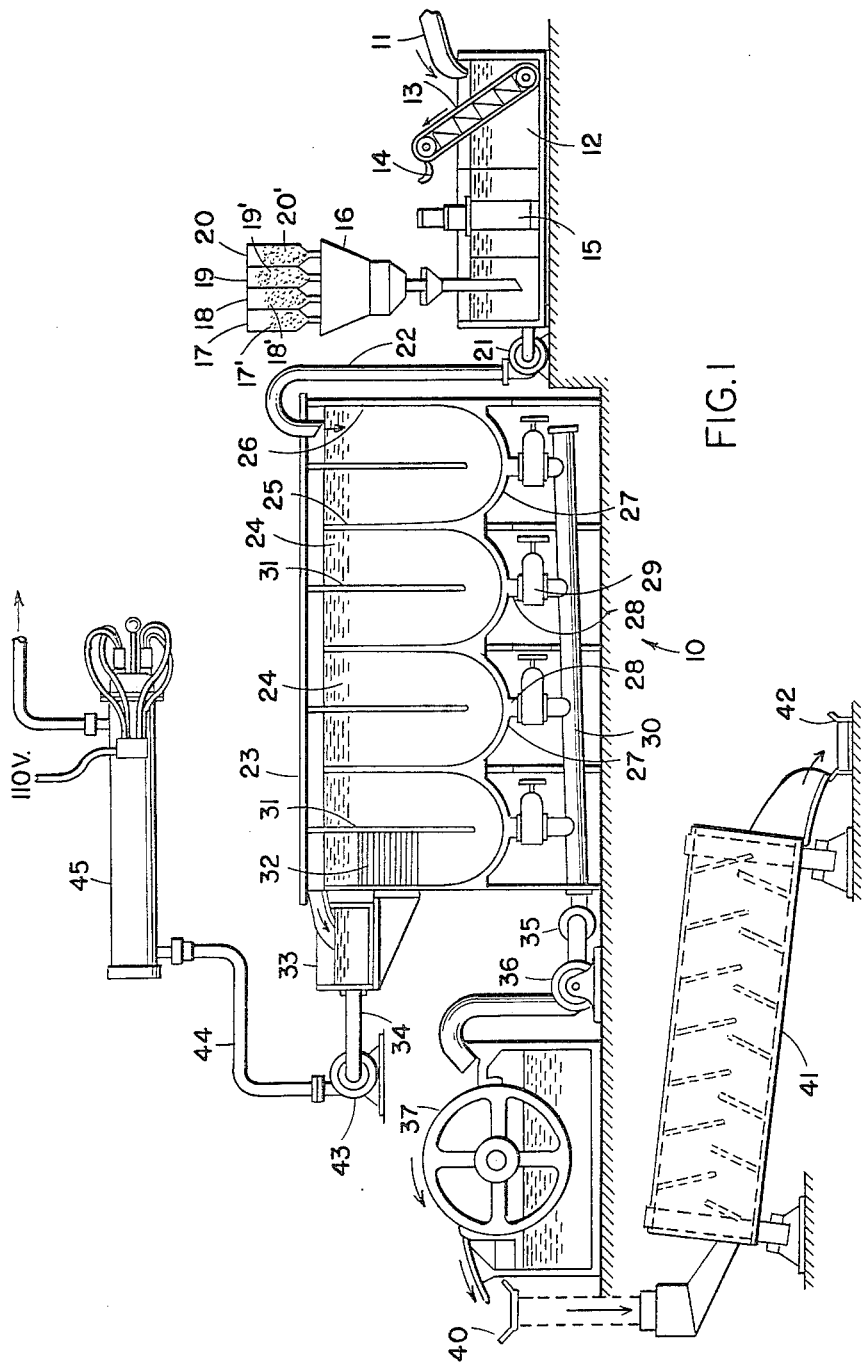
FIG. 1 is a schematic side view of a sewage plant according to the invention.

Referring now in more detail to the drawing illustrating a preferred embodiment by which the invention may be realized, there is disclosed in FIG. 1 a schematic side view of a sewage treatment plant, generally designated by the numeral 10. The raw sewage is introduced by a channel 11 into an open tank 12. A slowly moving inclined straining or screening apparatus 13, which may comprise a continuous band filter, is located in tank 12 for removing stones, trash and the like larger parts. The removed parts are carried off by a conveyor 14. A motor driven comminuter 15 is arranged in tank 12 for converting the raw sewage after the screening into a homogeneous liquid mass. Toward the end of tank 12 a hopper 16 is provided through which the materials for treating of the sewage are fed into the liquid. There are preferably four compartments 17, 18, 19, 20, containing marl 17', lime 18', alum 19' and activated carbon 20', located above hopper 16, so that predetermined amounts of these materials may be added to the liquid for the performing of the process, described hereinbelow in more detail. An agitator (not shown in the drawing) may be placed in tank 12 for mixing the additives with the liquid.

The chemical reaction obviously starts immediately and the formed soft slurry is now pumped by a slurry pump 21 through a pipeline 22 into a settling tank 23 which consists of a plurality of compartments 24. Compartments 24 are separated from one another by walls 25 which end somewhat below the outer walls 26 and which permit the liquid to pass over the upper edge acting as a kind of weir. The bottoms 27 of compartments 24 are semi-cylindrically concavely shaped for the collecting of the settled sludge, and several outlets 28 are provided (the drawing shows three) for draining the sludge. The number of outlets 28 may vary according to the size of the compartments. Gate valves 29 are arranged for outlets 28, and the pipelines 30 are provided for carrying the sludge away. Each one of compartments 24 has a center baffle 31 which extends downwardly into the compartment, ending at a predetermined distance from the semi-cylindrical bottom 24.

A sand and gravel filter 32 is built into the last settling compartment. The water or other liquid which is now entirely free of foreign matter which was originally therein in both suspended and colloidal form, flows out of settling tank 23 into an overflow container 33 wherefrom it is pumped through pipeline 34 by a pump 43 into an ultraviolet ray sterilizer or purifier 45, where it is purified and sterilized by ultraviolet irradiation, to become hygienically treated water. The sludge which is carried by pipelines 30 is gathered in a manifold 35 from which it is pumped by a sludge pump 36 to a rotating vacuum filter 37 which is driven by a motor 38 through a gear reducer 39. The de-hydrated sludge is scraped off filter 37 and carried by a conveyor 40 to a slowly rotating drying drum 41 where it is dried by low heat. The dried product is discharged onto a conveyor 42 to be either packed directly for being used as a soil conditioner or for being further processed as a fertilizer.

The treatment process which is executed in the plant described above, is based upon reactions which may be described as follows: Heretofore it has been mentioned that the component parts in the sewage can be divided into three groups, that is, into suspended, dissolved and colloidal parts. It is no problem to filter out or settle suspended parts; dissolved parts can be treated chemically, but the colloidal parts which form by far the greatest portion of the foreign matter in the sewage, need the special treatment obtained by the process according to the present invention.

It is necessary to this extent to first render the liquid completely alkaline by adding lime and a natural calcarious mineral, known as marl. Marl is porous and has both very good absorbing and adsorbing qualities. These qualities not only add to the alkalinization of the raw sewage but also bind at once the putrid, offensive odors of the sewage, which develop by the rapid decomposition of the organic colloidal matter. Thus, the further putrification of the sewage is stopped at once and the process is conducted without offensive, bad odors. The two additives render the liquid alkaline; and the ions in the alkaline solution have a negative sign. By further adding an ionizable metal salt which has positive ions, such as alum which is the double salt of potassium and aluminum, a coagulating action on the colloids starts. This metal salt is a good electrolyte producing material which is apt to release the excess of positively charged ions upon its dissociation in the solution. Since there is the highly adsorptive material, marl, present, the uniting or adsorption of the positively charged ions with the negatively charged ions in the alkaline solution, precipitation and coagulation of the colloids is effected. The reaction of the negatively charged ions with the positive ions also releases a sizable amount of nascent oxygen which adds considerably to the destruction of bacteria and to the elimination of the putrid odors and also accelerates the process considerably. Furthermore, all components of all marls, as proven by reliable and competent analysis, are oxides, which release nascent oxygen, according to the ion chemistry. The presence of dissolved oxygen after the treatment in the treated liquid is proof of this ion reaction.

As a further component, activated carbon is added. This material is known as being highly adsorptive, and it is introduced in this process for a further strong adsorption of the coagulated colloids and at the same time for absorbing other very finely distributed and suspended particles for setting them out in the settling compartments of the tank. The action of the activated carbon not only shortens the settling time considerably but also helps by destroying bad and offensive tastes and odors of the water.

A typical analysis of a representative marl is substantially as follows:

| | | |
|---|---|---|
| Silica | $SiO_2$ | 0.90 |
| Alumina | $Al_2O_3$ | 0.35 |
| Ferric oxide | $FeO_3$ | 0.01 |
| Ferrous oxide | $FeO$ | 0.12 |
| Pyrite | $FeS_2$ | 0.03 |
| Magnesium oxide | $MgO$ | 1.05 |
| Calcium oxide | $CaO$ | 53.55 |
| Strontium oxide | $SrO$ | 0.01 |
| Barium oxide | $BaO$ | 0.01 |
| Sodium oxide | $Na_2O$ | 0.01 |
| Potassium oxide | $K_2O$ | 0.03 |
| Water, hygroscopic | $H_2O-$ | 0.44 |
| Water combined | $H_2O+$ | 0.10 |
| Carbon dioxide | $CO_2$ | 43.22 |
| Titanic oxide | $TiO$ | 0.02 |
| Phosphorous pentoxide | $P_2O_3$ | 0.07 |
| Sulphur trioxide | $SO_3$ | 0.01 |
| Manganous oxide | $MnO$ | 0.03 |
| Organic carbon | | 0.01 |

With respect to the quantitative composition or formula of the mix of marl, lime, alum and activated carbon, the same will vary according to the type of sewage, industrial waste or other waste material to be processed.

Relating to the use of marl, the latter is a specific for substantially all odors producing compounds in sewage. This is due to its reactive powers as well as its absorptive and adsorptive powers. Another important quality in the marl is that it is a natural filter agent with just about the right specific gravity to make sludge a substantially perfect material for handling without any odor. It will not mold or sour under any condition.

The effluent is preferably run through ultraviolet sterilization equipment, the latter being diagrammatically indicated by the reference number 45, it being understood that any suitable equipment or apparatus may be used for the purpose. The use of ultraviolet sterilization equipment avoids any possible contamination from microorganisms or pathogens, which cause cholera, poliomyelitis, infectious hepatitis. This is a bacteriological safeguard without the use of chlorine.

While the invention has been described and illustrated with respect to certain preferred examples which give satisfactory results, it will be understood by those skilled in the art after understanding the principle of the invention, that various changes and modifications may be made without departing from the spirit and scope of the invention and it is intended therefor in the appended claims to cover all such changes and modifications.

What we claim is:

1. Process of treating sewage or like waste material containing organic matter in a colloidal form, comprising the steps of comminuting said sewage for converting it into a substantially uniformly distributed form, adding to said comminuted sewage a mix comprising, marl, lime, alum and activated carbon, coagulating said organic colloidal matter in said sewage by said mix, adsorbing said coagulated matter, settling said coagulated and adsorbed matters, and filtering the resulting effluent after the settling.

2. Process of treating sewage or like waste material according to claim 1, and producing nascent oxygen by the ionizing interaction of said marl and said alum, and using said nascent oxygen for further improving said treatment process.

3. Process of treating sewage or like waste material according to claim 1, and said comminuting being done mechanically.

4. Process of treating sewage or like waste material according to claim 1, and wherein said sewage is screened prior to comminuting.

5. Process of treating sewage or like waste material according to claim 1 and further filtering said settled coagulated matter, settling said coagulated and adsorbed whereby said matters become usable as soil conditioning means.

6. Process of treating sewage or like waste material according to claim 1, and sterilizing said effluent by exposing the latter to irradiation of ultraviolet rays.

7. A plant for processing of sewage, industrial or like waste material, comprising, in combination, means for comminuting said sewage, means for adding a compound mix of marl, lime, alum and activated carbon to said comminuted sewage, a plurality of settling compartments connected in series for separating the solid matter from the liquid matter of said sewage, said settling compartments having concave-shaped bottoms, baffle means in said settling compartments, and filter means in the compartment reached last by the liquid matter in flowing through the series connected settling compartments.

8. A plant for processing of sewage or like waste material according to claim 7, and means for screening said sewage prior to comminuting said sewage.

9. A plant for processing sewage or like waste material, according to claim 8, and ultraviolet ray emitting means at said last compartment for sterilizing said liquid matter after being treated by said mix.

References Cited

UNITED STATES PATENTS

| | | | |
|---|---|---|---|
| 636,497 | 11/1899 | Delattre | 210—152 |
| 1,440,253 | 12/1922 | Travers | 210—52 |
| 1,440,254 | 12/1922 | Travers | 210—255 |
| 1,633,079 | 6/1927 | Engle | 210—151 X |
| 1,876,123 | 9/1932 | Wright | 210—152 |
| 2,106,851 | 2/1938 | Nordell | 210—152 |
| 2,128,393 | 8/1938 | Allen | 210—46 X |
| 2,852,584 | 9/1958 | Komline | 210—10 X |

OTHER REFERENCES

Report of committee, American Public Health Assn., Chemical Treatment of Sewage, Sewage Works Journal, vol. 7, November 1935, pp. 1007–1011 relied on.

MICHAEL E. ROGERS, Primary Examiner

U.S. Cl. X.R.

210—51, 52, 152, 201